United States Patent [19]

Liebermann

[11] Patent Number: 5,354,621
[45] Date of Patent: Oct. 11, 1994

[54] BIODEGRADABLE CONSTRUCTION MATERIAL AND MANUFACTURING METHOD

[75] Inventor: Benno E. Liebermann, Louisville, Ky.

[73] Assignee: Beltec International, Aurora, Ill.

[21] Appl. No.: 907,913

[22] Filed: Jul. 2, 1992

[51] Int. Cl.$^5$ .............................................. B32B 23/04
[52] U.S. Cl. ................................. 428/532; 426/138; 426/139; 523/128; 524/15
[58] Field of Search ......................... 523/128; 524/15; 426/138, 139; 119/51.03; 428/903.3

[56] References Cited

U.S. PATENT DOCUMENTS

| | | | |
|---|---|---|---|
| 1,509,194 | 9/1924 | Dresser | 426/76 |
| 2,733,138 | 1/1956 | Clark | 523/147 |
| 2,892,719 | 6/1959 | Lynn | 99/88 |
| 3,429,770 | 2/1969 | Ayers | 524/15 |
| 3,481,257 | 12/1969 | Shimp et al. | 524/15 |
| 3,554,941 | 1/1971 | Varnell | 523/513 |
| 3,800,977 | 4/1974 | Stager et al. | 220/83 |
| 3,850,677 | 11/1974 | Vasisth | 524/15 |
| 3,850,862 | 11/1974 | Clendinning et al. | 260/7.5 |
| 3,850,863 | 11/1974 | Clendinning et al. | 260/7.5 |
| 3,932,319 | 1/1976 | Clendinning et al. | 260/7.5 |
| 4,016,117 | 4/1977 | Griffin | 523/128 |
| 4,107,383 | 8/1978 | Reid | 524/15 |
| 4,224,416 | 9/1980 | Taylor et al. | 521/94 |
| 4,251,554 | 2/1981 | Baisden | 426/128 |
| 4,472,440 | 9/1984 | Bank | 426/128 |
| 4,957,754 | 9/1990 | Munk et al. | 426/138 |
| 5,160,368 | 11/1992 | Begovich | 426/138 |

FOREIGN PATENT DOCUMENTS 61-188438  8/1986  Japan.
2180139B  8/1989  United Kingdom.

OTHER PUBLICATIONS

*Warner–Lambert Announces Starch–Based Degradable Plastic*, Los Angeles Times, Jan. 7, 1990.
*Warner–Lambert Commercializes Two Grades Of Degradable Resins*, Plastics News, Jul. 8, 1991.
*Biodegradable Gluten Plastics*, Yasui, Dosse and Yamashita.

Primary Examiner—Veronica P. Hoke
Attorney, Agent, or Firm—Wallenstein, Wagner & Harris, Ltd.

[57] ABSTRACT

A material for use in the construction of plates, films, food containers and like containers. The material is suitable for use with human foods, and comprises by-products from an agricultural milling process and a binder. The agricultural by-product is preferably selected from the group including corn hominy, wheat bran, soy hulls, rice hulls and oat hulls. The binder may be either inherent in the by-products or added to the by-products. If added, the binder may be synthetic or organic.

12 Claims, No Drawings

BIODEGRADABLE CONSTRUCTION MATERIAL AND MANUFACTURING METHOD

DESCRIPTION

1. Technical Field

This invention relates to biodegradable material for use in the construction of plates, films, food containers, like containers, and other articles of construction. The biodegradable material of the invention is suitable for use with human foods, and is made from the by-products of an agricultural milling process and a binder.

2. Background of the Invention

Hundreds of pounds of solid waste are produced each year by each person living in industrialized societies. The disposal of such solid waste is an enormous problem, and the problem promises to become more difficult with increasing population. Although persons in nonindustrialized countries typically produce fewer pounds of solid waste per person, the increasing industrialization of those countries will exacerbate this problem.

Tableware made from nonbiodegradable plastics, including polystyrene, is in common use throughout the United States and other industrialized countries. Typical of this tableware is clamshell packaging for sandwiches and polystyrene insulating cups for hot drinks, such as coffee. Such polystyrene tableware creates additional waste disposal problems in that it does not degrade in landfills for hundreds of years, and perhaps longer.

As a result, efforts are underway to create biodegradable tableware. One such effort is disclosed in U.K. Patent No. GB 2 180 139 B to Liang-Erh Chen, issued on Aug. 23, 1989, and entitled "PROCESS FOR MAKING SANITARY TABLEWARE." This patent describes the manufacture of sanitary tableware using a cereal substance such as rice grains or wheat flour. Literature and videotapes available from the assignee of this invention suggest that oatmeal is also being used as a suitable cereal substance for the manufacture of disposable tableware. Plates submitted by the assignee to the inventor of the present invention have proven to be quite brittle.

Efforts at manufacturing biodegradable polymers include work done by the Warner-Lambert Company. In a Jan. 7, 1990, *Los Angeles Times* article, Warner-Lambert announced a new plastic resin said to be made "almost entirely" from starch. The product created by this discovery is sold under the trademark NOVON TM bio-plastic starch. This product is said to be made from starch extracted from potatoes, wheat, rice and corn.

A Jul. 8, 1991, article from *Plastics News* claims that Warner-Lambert has commercialized two grades of the degradable resins and begun construction of a production plant. NOVON TM 3001 is said to be useful for injection molding whereas NOVON TM 2020 is said to be useful in foam extrusion.

A Japanese manufacturer claims to have made a biodegradable gluten plastic. Gluten, which is insoluble in water, is the general term for protein occurring in wheat. This Japanese manufacturer has claimed to have produced semi-transparent sheets by blending powdered gluten with urea, glycerol, diethyleneglycol, emulsified silicone oil and sulfur. The urea allows the gluten to be easily plasticized. The manufacturer claims that these sheets, after burial, are covered with mold after one week and decompose completely after just four weeks. A Japanese publication by Yasui, Dosse and Yamashita discloses this invention.

ICI in Wilmington, Del., has developed a fermentation process to breed bacteria normally found in soil. When fed sugar and acid, these bacteria produce a polymer called PHBV (hydroxy butyric valeric acid). The polymer is harvested as a powder, and then made into resins that are said to be as strong as conventional plastic.

Biodegradable plastic additives are manufactured by Ampacet of Mount Vernon, N.Y. The additives are allegedly photosensitive materials which initiate a chemical and physical breakdown of the polymeric backbone of a film upon its exposure to the ultraviolet radiation from the sun.

Ecostar International of Amherst, N.Y., also manufactures additives under the trademarks ECOSTAR ® master batch and ECOSTARplus TM master batch. These additives are said to ensure degradability when added at levels of 14 and 12 percent, respectively. ECOSTAR ® master batch is a concentrate containing approximately 43 percent starch as well as an auto oxidizable additive. It is designed for polyethylene film and most rigid packing applications. ECOSTARplus TM master batch is a concentrate containing approximately 43 percent starch and an auto oxidizable additive to provide biodegradation upon burial or submersion.

An additional biodegradable plastic additive is manufactured by the Weisstech Corporation of Roslyn Heights, N.Y.

SUMMARY OF THE INVENTION

The invention is a biodegradable material for use in various applications and environments. Some of these applications include plates, films, food containers and like containers. Other applications include, but are not limited to, hamburger clamshells, french fry holders, silverware, trays, clay pigeons, flower pots, golf tees, structural building materials and furniture materials. This biodegradable material is suitable for use with human foods, and comprises the by-products from an agricultural milling process and a binder.

The term "biodegradable" has no commonly accepted definition. For purposes of the present invention, the term "biodegradable" shall mean a material or product which contains at least 50 percent material that is naturally occurring or derived, i.e., can be grown in nature or is derived from products that are grown in nature. One typical dictionary definition of biodegradable is "capable of being broken down, especially into innocuous products, by the action of living beings (as microorganisms)."

Preferably, the agricultural by-product to be used in connection with the material of the invention is a product that is not now normally eaten by humans. As such, such materials have a small market value relative to the value of humanly consumable food products. Such nonedible agricultural by-products, including corn hominy, wheat bran, soy hulls, rice hulls and oat hulls, are currently either discarded or used in animal feeds. As a result of the present invention, these largely underutilized by-products can be used for a novel, largely biodegradable material for construction.

The binders used in the present invention can be selected from a broad class of materials. A binder is any substance which, when combined with the agricultural by-product used in this invention, results in a semi-rigid or rigid structure after final processing. Essentially, the purpose of the binder is to provide a "glue" for the agricultural by-products. In other words, the binder gives the material of the invention a shape and structural integrity.

In the present invention, the binder may be either inherent in the by-products or added to the by-products. In addition, the binder may be either organic or synthetic. Examples of suitable organic binders include corn starch, dextrin, wet corn gluten, dried corn gluten meal, animal glue, wheat gluten, gelatin, carrageenan, and various other gums including guar gum, alginates, urea, sugars, chitosan and beeswax. Examples of suitable synthetic added binders include an H.B. Fuller hot melt adhesive currently sold under No. HL-7276. This Fuller hot melt adhesive is a blend of polymers, resins, plasticizers and waxes that is solid at room temperature. It is considered to be 100 percent solids. It can be repeatedly melted and solidified without generally hindering its properties.

In addition to the above-referenced added adhesives or binders, the inherent adhesive or binder present in these agricultural by-products can also be used. Typically, the inherent binders in these agricultural by-products may be removed by imposition of severe stress, such as twin screw extrusion, upon the ground by-product. Twin screw extrusion will result in a release of the inherent binder to the surface of the agricultural by-product. Twin screw extrusion is also believed to result in a change in the configuration of the ground or prepowdered agricultural by-product.

In order to attain best results, the agricultural by-product is ground to a relatively small mesh. Preferred is an agricultural by-product which is ground to between about 1–1000 microns, most preferably about 150 microns. In order to render the construction material of the present invention biodegradable to the greatest extent, it is preferred that at least 75 percent of the material is organic. For purposes of the invention, the entire by-product from the agricultural milling process, including its inherent binder, is deemed to be organic and, thus, biodegradable. Thus, material of the present invention manufactured with the agricultural by-product and an organic binder, or an inherent binder, is completely biodegradable.

In contrast, material of the present invention manufactured with both the agricultural by-product and a synthetic binder is only partially biodegradable. This is because the synthetic binder is, by definition, not biodegradable. In a material comprised of both agricultural by-product and synthetic binder, degradation of the agricultural by-product will occur, and this degradation will not be impeded by the presence of the synthetic binder.

The invention is also a method for the manufacture of the present material. The method comprises grinding the by-products from the agricultural milling process to a powder form. The by-products are then combined with an added binder. Finally, the agricultural by-product and added binder combination is formed by one of a variety of different methods into a cup, container, sheet or any suitable structure. Again, the binder of this method may either be organic or synthetic, and the organic binder may be either added or inherent in the agricultural by-products.

When the binder is inherent, and thus needs to be extracted from the agricultural by-products, the method for manufacturing the present material takes on a different form. Particularly, as in the procedure for the manufacture of the material with added binders, the agricultural by-product is first ground to a fine or powdered form. Second, the powder is subjected to shear conditions to bring the inherent organic binder from that by-product to its surface. Finally, the agricultural by-product and inherent binder combination are formed into a cup, container, sheet or other useful article.

An object of the invention is a material which can be used to manufacture disposable tableware, and which in and of itself is either entirely or substantially biodegradable. A further object of the invention is a material which will reduce the polystyrene and wood or cellulose dependency of container or other product manufacturers and users.

Reduction of dependence on polystyrene has several important effects. Because polystyrene is petroleum derived, a reduction in the demand for polystyrene reduces oil demand, energy prices and adverse environmental effects from unintentional incidents connected with oil exploration and shipment, including sea-based oil well accidents and petroleum releases from disabled or grounded oil tanker ships. Further, a reduction in this use of nonbiodegradable polystyrene reduces a currently substantial solid landfill problem.

DETAILED DESCRIPTION OF THE PREFERRED EMBODIMENT

While this invention is susceptible of embodiment in many different forms, there will herein be described in detail a preferred embodiment of the invention with the understanding that the present disclosure is to be considered as an exemplification of the principles of the invention and is not intended to limit the broad aspect of the invention to the embodiment illustrated.

The present invention is a material for use in the construction of plates, films, food containers, like containers, and other varied products. The material is also useful for the construction of other products for a wide variety of applications. Due to the potential strength of the present material, its anticipated uses include the foundation for structural building two-by-fours. The material is suitable for use with human foods, in that it includes no binders, additives or raw materials that are known poisons or toxins. The ultimate product can later be recycled by grinding, and this ground product may then be used as an animal food additive or fertilizer.

For the purposes of the present invention, the by-products from an agricultural milling process are defined to include, but not be limited to, hulls or mill feeds. Currently, these hulls or mill feeds are inexpensive, ranging in price from as little as approximately $2.00 per ton to as much as approximately $112.00 per ton. Even at $112.00 per ton, however, these hulls or mill feeds cost only about $0.06 per pound, approximately 1/10 of the current cost of polystyrene.

Although various types of hulls and mill feeds could be used, a long list of agricultural milling byproducts have already been used in connection with this invention. These include white (corn) hominy from Wilson's Corn Products, Inc., of Rochester, Ind. A mixture of yellow and white (corn) hominy from Nunn Milling Company, Inc., of Evansville, Ind., has also been used. Whole, cleaned oat hulls, reground oat hulls and oat bran have been used and are available, respectively, from General Mills, Inc., of Minneapolis, Minn., the National Oats Company of Cedar Rapids, Iowa, and Natural Foods, Inc., of Toledo, Ohio. Ground rice hulls from Louis Dreyfus Corporation of New Madrid, Mo., are the least expensive hulls or mill feeds that have been used. Also believed suitable are soy hulls from Central Soya of Indianapolis, Ind.; wheat bran from Scotts Auburn Mills, Inc., of Auburn, Ky.; and soft winter wheat shorts with ground wheat screenings from Scotts Auburn Mills, Inc., of Auburn, Ky. The inventor has concluded that corn hominy feed is the most suitable material for the manufacture of hot beverage cups.

Additional United States milling facilities can be found in the "Milling Directory and Buyer's Guide," published by Sosland Publishing Company, 9000 West 67th Street, Merriam, Kans. 66202. This Guide also contains a partial roster of Canadian central American mills.

The raw, untreated agricultural milling by-products obtained from these mills are generally too large and coarse to be used in the manufacture of the processed material of the present invention. Accordingly, the by-product is typically ground, resulting in small particle sizes. These smaller particle sizes provide an increase in surface area for a given mass of agricultural by-product. As a result, the natural or added binder can cover a greater surface area of the agricultural by-product, increasing the strength of the ultimate material formed by the by-product/binder combination.

The agricultural by-products may be ground by feeding the raw material through a hammermill. A small laboratory-type research hammermill is available from the Fitzpatrick Company of Elmhurst, Ill. Fitzpatrick Model Nos. J and JT HOMOLOID® hammermills can process up to 50 pounds of by-products per hour. The Model J Fitzpatrick hammermill has a stainless steel platform mounted on a mobile stand, and is available with a 3 hp. 3600 rpm or 1800 rpm motor.

Either of two hammermills manufactured by Glen Mills, Inc., of Maywood, N.J., should also prove suitable. These hammermills are sold by Glen Mills as the Cross Beater and Ultra Centrifugal mills. In particular, these machines have successfully ground corn hominy samples. The Cross Beater mill can create ground particles of various sizes. When using friable, medium-hared substances and a 0.50 mm. screen, the ground material is expected to have the following approximate particle size spread: 98 percent smaller than 0.35 mm.; 70 percent smaller than 0.15 mm.; and 40 percent about 0.07 mm.

The Glen Mills Ultra Centrifugal mill grinds products instantaneously as fine as 40 microns or less. It has been found that the Ultra Centrifugal mill produces particles of great uniformity, i.e., with a narrow particle size spread. The samples of corn hominy ground with the Glen Mills Ultra Centrifugal mills, however, have not yet been used to manufacture the material in accordance with the invention.

Stone grinding has been used to process the agricultural by-product actually used to manufacture material in accordance with this invention. Raw by-product in the form of corn hominy and reground oat hulls have been stone ground by SWECO of Florence, Ky. For the corn hominy, the grinding media was a SWECO Model No. DM-1 stone grinder with a lead angle of 30° and four bottom weights. Five pounds of corn hominy were loaded into the mill with 80 pounds of 2 inch ceramic spheres. With samples taken after 6, 12 and 32 minutes of grinding, there was no apparent change in the appearance of the material.

The grinding media was altered after 32 minutes of grinding. In particular, the 24 pounds of 2 inch spheres were replaced with 24 pounds of 1.125 inch ceramic spheres, and then the material was ground another 32 minutes. After 64 minutes, the material had the following size distribution: greater than 30 mesh, 7.80 percent; greater than 40 mesh, 26.00 percent; greater than 50 mesh, 27.80 percent; greater than 60 mesh, 31.20 percent; greater than 80 mesh, 5.00 percent; greater than 100 mesh, 0.10 percent; and smaller than 100 mesh, 0 percent.

The corn hominy feed as stone ground by SWECO was used in the manufacture of a by-product/binder blend, with the binder comprising Fuller No. HL-7276 hot melt adhesive. This blend was formed into cups on the day following the grinding. Stone grinding was found suitable for use with corn hominy feed. After further testing, however, it was concluded that stone grinding was unsuitable for the more fibrous agricultural milling by-products, such as oat- and rice-based materials.

For small, laboratory size runs, the most suitable grinding apparatus is the Kitchen Mill, manufactured by K-TEC of Orem, Utah, using a fine setting. After the agricultural by-product has been ground on the fine setting of the Kitchen Mill, that ground product is blended with a binder. The following examples disclose methods of making the material of the invention with various types of added or inherent binders.

EXAMPLE 1

A synthetic binder is used in conjunction with ground by-products from an agricultural milling process. The thermoplastic binder, available from H.B. Fuller as No. HL-7276 hot melt adhesive, is heated to a temperature above its melting point. In this example, the thermoplastic binder is heated over a hot plate. Any alternative means of heating the thermoplastic binder to a temperature in excess of about 300° F. and as high as 425° F. is acceptable. While the binder is maintained at a temperature between 300°–400° F., the preground agricultural by-product is mixed into the binder. The by-product/binder blend is stirred, as with a wooden shim or spoon, until the entire blend becomes so viscous that no further by-product can be added. Particularly, one can determine when this point has been reached upon the discovery that any additional by-product would not "stick" to the by-product/binder blend mass.

After this mass has been allowed to cool to room temperature, the formulation is reheated with a hot plate or the like to a temperature above the melting point of the hot melt adhesive. In its newly remelted state, the temperature of the entire blend is between 200°–450° F. A portion of the blend in its molten state is removed from the hot plate with a wooden spoon or shim, and weighed on a scale. Thirty to 50 grams of this by-product/binder blend is necessary in order to create a cup that will hold approximately 8 ounces of coffee.

A Bliss or Verson double-crank impact extrusion machine or press having a bed area of 108×48 inches and a capacity of 300 tons may be used to manufacture cups from the blend material of the present invention. Thirty to 50 grams of the composition is poured into a cavity of this impact extrusion machine. The dwell time for the punch is typically between 1–10 seconds, and a typical 8 ounce hot drink cup requires the delivery of from 40–150 tons on press pressure. After pressing, the container is removed from the cavity with an ejector pin.

EXAMPLE 2

Organic binders may also be added to the agricultural milling process by-products. Typically, these added organic binders are in a powdered form. These supplemental organic binders may be selected from the list including corn starch, dextrin, wet corn gluten, dried corn gluten meal, wheat gluten, gelatin, animal glue, alginates, carrageenans, and various other gums, sugars and chitosan.

These containers may be formed by first grinding the raw agricultural milling by-product using a fine setting on a K-TEC Kitchen Mill. The ground product is placed in a container, and the preferred powdered organic binder is added. The entire by-product/binder formulation is then mixed with a hand mixer or other similar mechanical mixer.

This combined mill by-product/binder blend is then put through the fine setting of a K-TEC Kitchen Mill. The use of the Kitchen Mill results in uniform particle sizes and a more thorough distribution of the binder throughout the by-product.

A Bliss or Verson double-crank impact extrusion machine or press having a bed area of 108×48 inches and a capacity of 300 tons may be used to manufacture cups from the blend material of the present invention. In order to obtain the best possible containers from these blend materials, the die in the Bliss or Verson press should be preheated with heater bands to temperatures of between 90°–250° F.

A predetermined amount of the cold agricultural by-product/binder aggregate, preferably between 35–55 grams, is poured into this preheated die. The dwell time for a cup made from this type of binder is typically longer than the dwell time for cups made from the thermoplastic binder. In particular, the dwell time for material made from this type of binder is between 10–60 seconds.

A product in the shape of an ash tray and comprised of 10 percent sodium alginate and 90 percent oat hulls (dwell time=5 seconds, cold die) was placed in boiling water for one hour, removed from the water and dried. The product maintained its structural integrity.

EXAMPLE 3

Corn hominy, wheat bran, soy hulls, rice hulls, oat hulls and the various other agricultural milling by-products that can be used in accordance with this invention contain inherent binders. Thus, if these inherent binders can be released from the milling by-products, these inherent binders could be used in lieu of the added synthetic or organic binders.

One way of releasing this inherent binder is through twin screw extrusion. Typical of useful extruders is the twin screw food extruder Model No. MPF-40 portable, twin screw food extruder. This twin screw extruder has an adjustable barrel valve, and is capable of zoned control of barrel temperatures through electric heating and water cooling. Temperatures are measured through product thermocouples in select locations along the barrel.

In particular, the cleaned oat hulls or other agricultural by-products would be first ground into small particles, in the same general manner as described in Examples 1 and 2. Instead of then adding an additional organic or synthetic binder, however, the fine powder is fed into a twin screw extruder. At this point, additional moisture may be added to the by-products, if desired. At this point, the powder can be subjected to a variety of processing shear pressures and temperatures. The closest distances attained between the flights of adjacent screws of the twin screw extruder are typically very small. As a result, the shape of the powdered by-product is changed by processing through these twin screws.

During the resulting reshaping particle size reduction, the surface area of the powder-like particles is increased. This is because the powder goes from a substantially spherical shape upon entering this twin screw extruder to a more oval or egg-like shape upon exiting from the twin screw extruder. It is believed that a temperature of between 280°–350° F. is ideal for effecting this change in shape, and for releasing the binder inherent in the agricultural by-product.

Moreover, as a result of this change in shape, the reshaped powder has a larger surface area, greatly improving its heat transfer coefficient and thermal insulation properties. The shear causing this change in shape also results in the release of the inherent binder in the agricultural by-products.

When the particles are removed from the twin screw extruder and pressed together in the hydraulic press in the same manner as described above for Example 1, the end product will include more air pockets than a product made from the spherical powder. This is because a material made from the oblong or egg-type shape of the sheared, powdered product would have more air gaps than a material made with a nonsheared, spherical powder. These additional air pockets will retard the transfer of heat from one side of the material to the other. As a result, a cup or other container made from this sheared material will be more suitable for insulating hot liquids contained.

Containers or other objects formed from the material of the present invention could be manufactured by a variety of different means. In addition to impact extrusion, these alternative means include injection molding, cinter-forming, longitudinal profile extrusion, calendaring processes, form-fiber molding techniques, and foaming processes that are designed to enhance the thermal barrier of end products for specific end uses.

Various different by-product/binder combinations resulted in a useful material in accordance with the invention. Several of these examples follow.

EXAMPLE 4

One hundred fifty grams of raw white corn hominy is milled on the fine setting of a K-TEC Kitchen Mill. Fifty grams of a wheat gluten binder is then added, and the blend is thoroughly mixed in accordance with the method described in the above Example 2. This product is 100 percent biodegradable, as it is made with an agricultural by-product and an added organic binder.

The entire formulation is then milled again using the fine setting of a K-TEC Kitchen Mill. This second milling step mixes the by-product/binder blend thoroughly and provides a consistent particle size.

The die is kept at a warm temperature, particularly at about 250° F. The by-product/binder powder blend is then placed in the die, and the product impact extruded in accordance with the methods of Example 2. The resulting manufactured cup is stable, but somewhat inelastic.

EXAMPLE 5

Using the method of Example 1, various additional cups were made from a by-product/binder material in accordance with the invention. The 10 batches used to make cups included the following components: Batch No. 1, 600 grams Fuller No. HL-7276 binder, 300 grams stone ground corn hominy feed, and a small amount of titanium dioxide; Batch No. 2, 450 grams Fuller No. HL-7276 binder, 300 grams stone ground corn hominy feed, and a small amount of titanium dioxide; Batch No. 2, 299.50 grams Fuller No. HL-7276, 300 grams stone ground corn hominy feed, and a small amount of titanium dioxide; Batch No. 4, 200.40 grams Fuller No. HL-7276, 300 grams stone ground corn hominy feed, and a negligible amount of titanium dioxide; Batch No. 5, 200 grams Fuller No. HL-7276 binder, 320 grams stone ground corn hominy feed, and a negligible amount of titanium dioxide; Batch No. 6, 201.60 grams Fuller No. HL-7276 binder, 256.40 grams stone ground corn hominy feed, and a negligible amount of titanium dioxide; Batch No. 7, 140 grams Fuller No. HL-7276 binder, 360 grams stone ground corn hominy feed, and a negligible amount of titanium dioxide; Batch No. 8, 200 grams Fuller No. HL-7276 binder, 161 grams stone ground corn hominy feed, 17.50 grams ground oat hulls, and a negligible amount of titanium dioxide.

The color of the cups may be varied for specific applications. This may be achieved by titanium dioxide for white colorization, or any of a number of F.D.A. approved dyes. Titanium dioxide, TiO2, is a white food grade powder also called titanic acid. Additionally, the finished containers are able to be screen printed or embossed.

A cup made with each of these formulations exhibited good structure, suitable appearance, and an ability to hold water at an initial temperatures of 208° F for one hour.

EXAMPLE 6

Eight additional batches were made using the synthetic binder method of Example 1. In each instance, 600 grams of the Fuller No. HL-7276 hot melt adhesive (binder) was combined with 300 grams of the agricultural by-product and between 15–90 grams of titanium dioxide. The amounts of agricultural by-product and titanium are as follows: Batch No. 1, 300 grams stone ground corn hominy feed, and 45 grams titanium dioxide; Batch No. 2, 300 grams stone ground corn hominy feed, and 90 grams titanium dioxide; Batch No. 3, 300 grams stone ground corn hominy feed, and 75 grams titanium dioxide; Batch No. 4, 300 grams stone ground corn hominy feed, and 60 grams titanium dioxide; Batch No. 5, 300 grams ground oat hulls, and 30 grams titanium dioxide; Batch No. 6, 150 grams stone ground corn hominy feed, 150 grams ground oat hulls, and 45 grams titanium dioxide; Batch No. 7, 300 grams ground oat hulls, and 15 grams titanium dioxide; Batch No. 8, 200 grams stone ground corn hominy feed, 100 grams ground oat hulls, and 75 grams titanium dioxide.

A cup made with each of these formulations exhibited good structure, suitable appearance, and an ability to hold water at an initial temperature of 208° F for one hour.

The elimination of odors can be achieved via (1) heat treatment of the agricultural by-product and/or binder during any point in the process, or the finished product; (2) exposure to a neutralizing process based on alcohol extraction; (3) antioxidants which would also retard mold and elongate shelf life. A partial list of antioxidants includes ascorbic acid, citric acid, propionic acid, carotene, or essential oils.

Aflatoxins may be destroyed by industrial treatment with ammonia. Cooking and freezing halt mold growth, but do not eliminate mycotoxins already produced. Irradiation is another, but more controversial, option for retarding mold.

The elimination of taste may be achieved with a coating, such as egg albumin, that may neutralize or "lock in" smell. Such a coating could be sprayed onto finished containers. Alternatively, scenting agents may be incorporated into the raw materials at any point in the process. A partial list of scenting agents includes lemon, clove, vanilla or olovan scents.

A surface treatment of the cups may be necessary to prevent nesting of the cups during transportation, since the by-product in its unfoamed form is approximately 10 times denser than already-expanded polystyrene. Prevention of nesting could also be achieved by mechanical means, such as adding fins to the container. Only 30 percent of the lengths of adjacent, stacked cups may contact each other. Fins would also retard heat transfer from the product.

With the addition of foaming agents, the by-product may be foamed to form air pockets, increasing the thermal barrier characteristics of the finish material.

While the specific embodiments have been illustrated and described, numerous modifications come to mind without significantly departing from the spirit of the invention, and the scope of protection is only limited by the scope of the accompanying claims.

What I claim is:

1. A method of manufacture of a rigid biodegradable food receptacle comprising the steps of:
   a. grinding to a powder a normally human non-eaten by-product from an agricultural milling process, a major portion of which is one of th groups consisting of rice, oat, corn, soy and wheat hulls and mixtures thereof;
   b. coating said powder with a binder which is non-toxic to human beings and a major portion of which is a natural binder of one of the groups consisting of corn starch, dextrin, glutens, gelatin, animal glue, gums, sugar, chitosan and beeswax; and
   c. forming said coated powder which is in a dry state at room temperature into the shape of said receptacle under selected temperature and pressure conditions which cause the binder to hold said particles together to maintain the structural integrity of the receptacle and forms a food leak-proof receptacle.

2. The method of claim 1, wherein said step of forming includes impact molding.

3. A method for the manufacture of a rigid biodegradable food receptacle, said method comprising the steps of:
   a. providing a normally, human, non-eaten agricultural by-product, a major portion of which is one of the groups consisting of rice, oat, corn, soy and wheat hulls and mixtures thereof, having as a natural part thereof an inherent organic binder-forming material and subjecting said by-product to a grinding operation which reduces the product to a powdered form but without said inherent binder being brought to the powder surfaces in sufficient amounts to form an effective binder without the addition of more binder material thereto, b. then subjecting said powder to shear forces sufficient to bring additional amounts of said inherent organic binder therein to the surfaces of the powder particles to form a more effective binder; and c. forming said binder-coated particles which are in a substantially water-free state at room temperature into the shape of said receptacle under selected temperature and pressure conditions where said binder coating on the powder particles securely binds the particles together to maintain the structural integrity of the formed food receptacle and forms a food leak-proof receptacle.

4. A method for the manufacture or a rigid biodegradable food receptacle, said method comprising the steps of:

a. grinding a normally, humam, non-eaten agricultural by-product a major portion of which is one of the groups consisting of rice, oat, corn, soy and wheat hulls and mixtures thereof, to a powder in substantially spherically-shaped form, said by-product having as a natural part thereof an inherent organic binder-forming material which can bind the powder particles together if brought to the surface thereof, said grinding being inadequate to bring said inherent binder-forming material in sufficient amounts to form an effective binder without the addition of more binder material thereto, b. then subjecting said powder to grinding forces which reshape the initially spherically shaped powder particles to a substantially non-spherical shape which brings said inherent organic binder therein to the surfaces of the powder particles to form a more effective binder; and c. forming said agricultural by-product and binder combination which is in a substantially water-free state at room temperature into the shape of said receptacle under selected temperature and pressure conditions where the binder coating on said powder particles securely binds the particles together to maintain the structural integrity of the formed receptacle and forms a food leak-proof receptacle.

5. A method for the manufacture or a rigid biodegradable food receptacle, said method comprising the steps of:

a. providing a normally, human, non-eaten agricultural by-product, a major portion of which is one of the groups consisting of rice, oat, corn, soy and wheat hulls and mixtures thereof, having as a natural part thereof an inherent organic binder-forming material, and subjecting said by-product to a grinding operation which reduces the product to a powdered form but without said inherent binder coating being brought to the surface in sufficient amounts to aid materially in the formation of a binder which securely binds the powder particles together to form an effective binder, said grinding being inadequate to bring said inherent binder-forming material in sufficient amounts to form an effective binder without the addition of more binder material thereto, b. then feeding said powder to a twin-extruder which applies forces to the powder particles sufficient to bring said inherent organic binder therein to the surfaces of the powder particles to form a more effective binder: and c. forming said binder-coated particles which is in a substantially water-free state at room temperature into the shape of said receptacle under selected temperature and pressure conditions where the binder coating on the powder particles securely binds the particles together to maintain the structural integrity of the formed receptacle and forms a food leak-proof receptacle.

6. The method of claim 1, 3, 4, or 5 wherein the binder-coated particles have insulating air pockets throughout the body.

7. The method of claim 1, 3, 4 or 5 wherein substantially all of said agricultural by-product is ground to a size of from about 1–1000 microns.

8. The method of claim 1, 3, 4 or 5 wherein at least 75 percent of said receptacle is organic.

9. The method of claim 3, 4 or 5 wherein said inherent binder coating said particles is the only binder holding said particles together.

10. The method of claim 3, 4 or 1 wherein said binder is in a dry state at room temperature.

11. The method of claim 3, 4 or 1 wherein the major portion of said agricultural by-product is one of the groups consisting or corn, wheat, soy, rice and oat nulls and mixtures thereof.

12. The product made by the method of claim 1, 3, 4, or 5.

* * * * *

UNITED STATES PATENT AND TRADEMARK OFFICE
CERTIFICATE OF CORRECTION

PATENT NO. : 5,354,621
DATED : October 11, 1994
INVENTOR(S) : Benno E. Liebermann It is certified that error appears in the above-indentified patent and that said Letters Patent is hereby corrected as shown below:

Column 10, Claim 1, line 40, delete "th" and insert --the--

Column 11, Claim 4, line 18, delete "humam" and insert --human--

Column 12, Claim 5, line 19, delete ":" and insert --;--

Column 12, Claim 10, line 40, delete "1" and insert --5--

Column 12, Claim 11, line 42, delete "1" and insert --5--

Signed and Sealed this

Twenty-third Day of May, 1995

Attest:

BRUCE LEHMAN

Attesting Officer     Commissioner of Patents and Trademarks